Nov. 26, 1968   W. M. BRUBAKER   3,413,463
RESOLUTION CONTROL IN MULTIPOLE MASS FILTER
Filed May 6, 1966   3 Sheets-Sheet 1

INVENTOR.
WILSON M. BRUBAKER
BY
Christie, Parker & Hale
ATTORNEYS

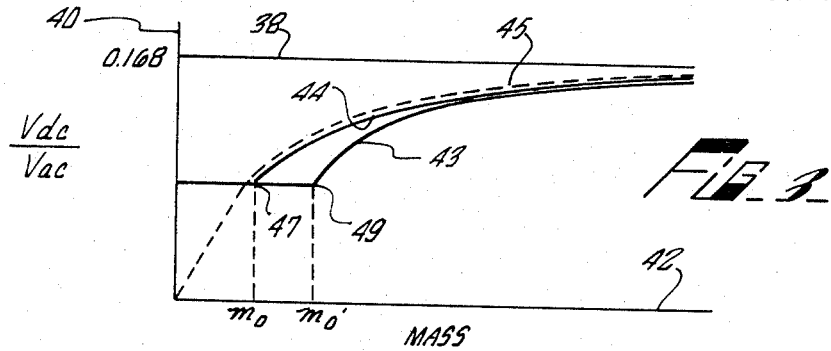
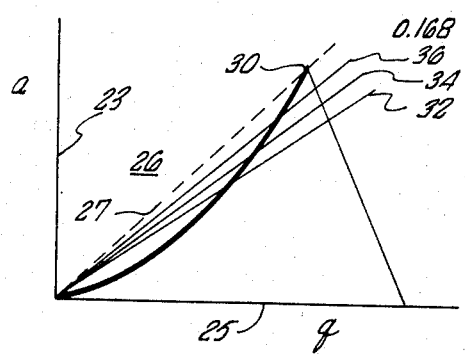
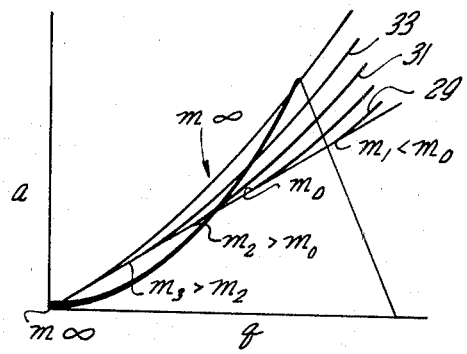
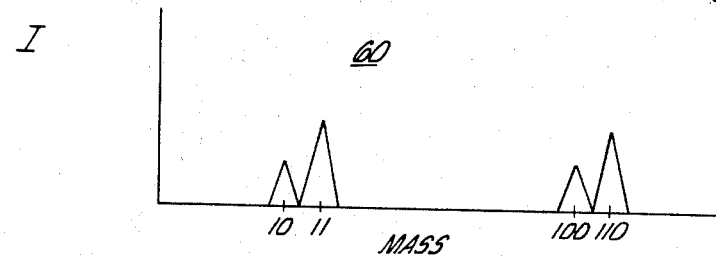
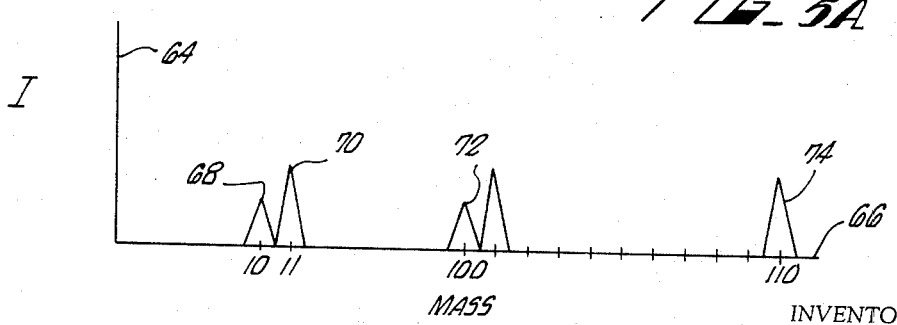

United States Patent Office 3,413,463
Patented Nov. 26, 1968

3,413,463
RESOLUTION CONTROL IN MULTIPOLE
MASS FILTER
Wilson M. Brubaker, Arcadia, Calif., assignor to Bell &
Howell Company, Chicago, Ill., a corporation of Illinois
Filed May 6, 1966, Ser. No. 548,131
1 Claim. (Cl. 250—41.9)

ABSTRACT OF THE DISCLOSURE

A mass filter utilizing combined AC and DC electric fields to achieve mass separation provided with automatic resolution control. The invention is applicable to the various types of mass filters including the monopole, dualpole and quadrupole filters and provides a modification of the energizing circuitry whereby the ratio of the DC component to the AC component of the combined fields is varied automatically thereby maintaining the width of mass peaks constant for all masses.

---

Figure 2:
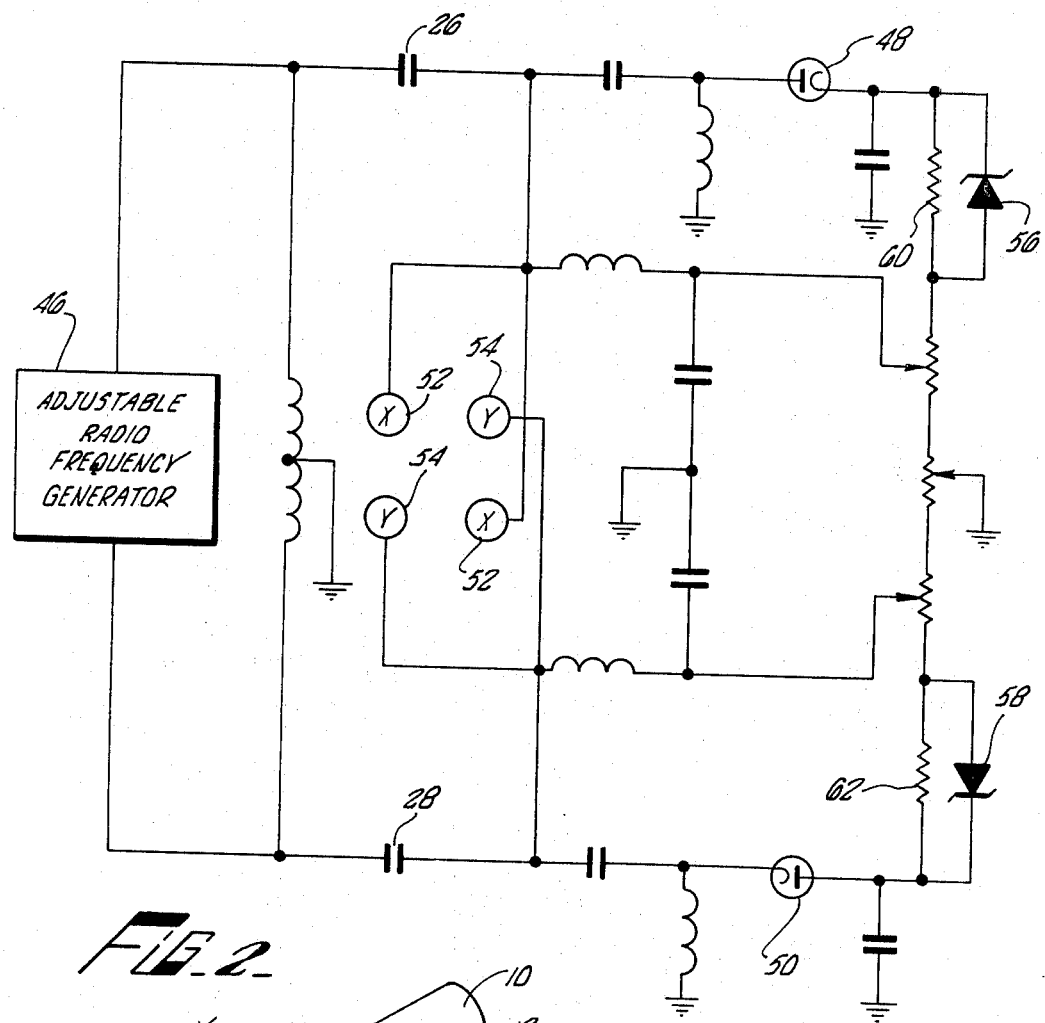

This invention relates to mass filters and in particular to multipole mass filters in which a uniform separation of adjacent mass peaks is obtained over a wide mass range.

In the mass spectrometry field, resolution is considered at an optimum when consistent ion species are separated such that adjacent mass peaks may be viewed without difficulty. Thus, whether masses 9 and 10, 90 and 91 or 900 and 901 are being examined, if the instrument is capable of providing separation between the peaks of the two masses in each or all of the three sets, the resolution is normally satisfactory.

In the normal operation of quadrupole mass filters, the ratio of the static or DC voltage component to the alternating or AC voltage component applied to the poles or rods of the filters is kept constant while the instrument scans over the mass range of interest. With constant ratio voltages being applied to the poles of the filter, the recorded signal is in the form of peaks on a recording chart which have a peak width, measured in atomic mass units for masses 10 and 11, and for masses 100 and 110, for example, which is proportional to mass. If the peaks of masses 10 and 11 coincide at their bases, then a similar result is obtained with respect to masses 100 and 110 with the obvious absence of a capability of observing the individual masses from 101 to 109.

In contrast to presently known mass filters, the present invention is directed to apparatus in which the ratio of the DC to the AC voltages is automatically varied according to a predetermined relationship during scanning such that above a predetermined point the width of the mass peaks is maintained constant for all mass values in atomic mass units. In terms of structure the invention provides a mass filter comprising at least one elongated electrode. Means for applying a DC voltage to the electrode is provided to produce a static multipole electric field component adjacent the electrode. Means are also provided for applying an AC voltage to the electrode to produce an alternating multipole electric field component adjacent the electrode. In addition, means are provided for changing the magnitude of the voltages applied to the electrode and for varying the ratio of the static component to the alternating component as the voltages applied to the electrode are changed such that above a predetermined point the width of mass peaks is maintained constant for all masses. Variation of the static to alternating field component ratios can be accompanied by varying the magnitude of the DC, the AC or both of the voltages applied to the electrodes. By the use of suitable circuit elements, the change of ratios can be accomplished automatically at predetermined instrument settings.

In terms of method, the invention provides a method for analyzing charge particles passing through a multipole mass filter that includes a plurality of substantially parallel elongated electrodes spaced symmetrically about a central axis. The method comprises the steps of applying a DC voltage to the electrodes to produce a static multipole electric field component between the electrodes and applying an AC voltage to the electrodes to produce an alternating multipole electric field component between the electrodes. The mass spectrum is then scanned and the ratio of the static field component to the alternating field component is automatically varied according to a predetermined non linear relationship with the change of mass of the charged particles being analyzed.

The primary advantage of the present invention is that it is now possible to automatically obtain resolution in a mass filter which produces uniform spacing between mass peaks regardless of the mass values being anlayzed. In addition, other resolving powers are automatically obtainable using the structure and method of this invention by providing means which produce predetermined variations in the ratio of the static and alternating field components applied to the electrodes as the mass spectrum is scanned. Depending upon the resolution desired, the electrical circuitry supplying the energizing potentials for the poles of the filter is altered to produce the desired AC to DC ratios and variations thereof. The present invention is applicable to monopole as well as multipole mass filters.

Figure 1:
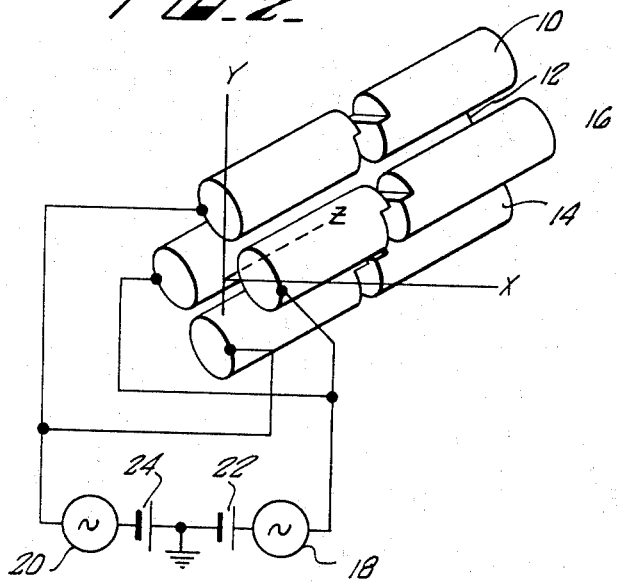

These and other advantages of the present invention will be more clearly understood by reference to the following figures in which:

FIG. 1 is a schematic diagram of a typical multipole mass filter,

FIG. 2 is an electrical schematic diagram of the circuit of this invention for providing a variable ratio of static to alternating voltage components applied to the rods of the filter, FIG. 3 is a plot of the ratio of the exciting voltages applied to the rods of the filter versus mass, FIG. 4A is a stability diagram of a quadrupole mass filter illustrating the scan lines of typical prior art quadrupole mass filters, FIG. 4B illustrates the scan lines in a filter according to the present invention, FIG. 5A is a mass scan obtained from a prior art quadrupole filter, FIG. 5B is a mass scan obtained from a quadrupole provided with resolution according to the present invention.

Figure 6:
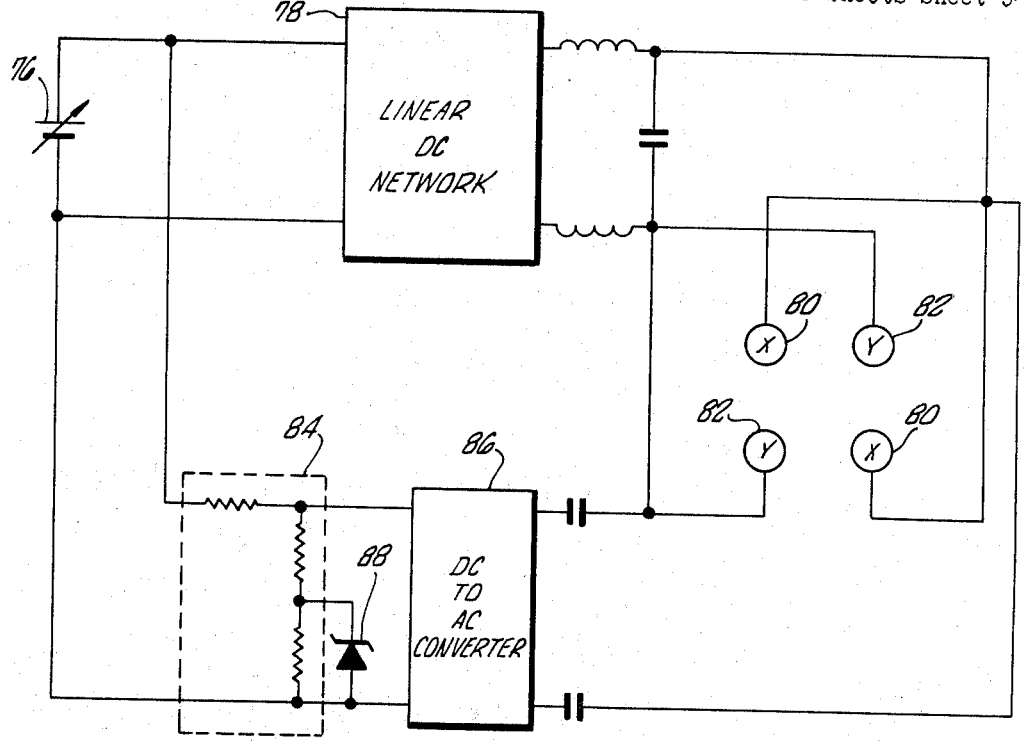
Figure 7:
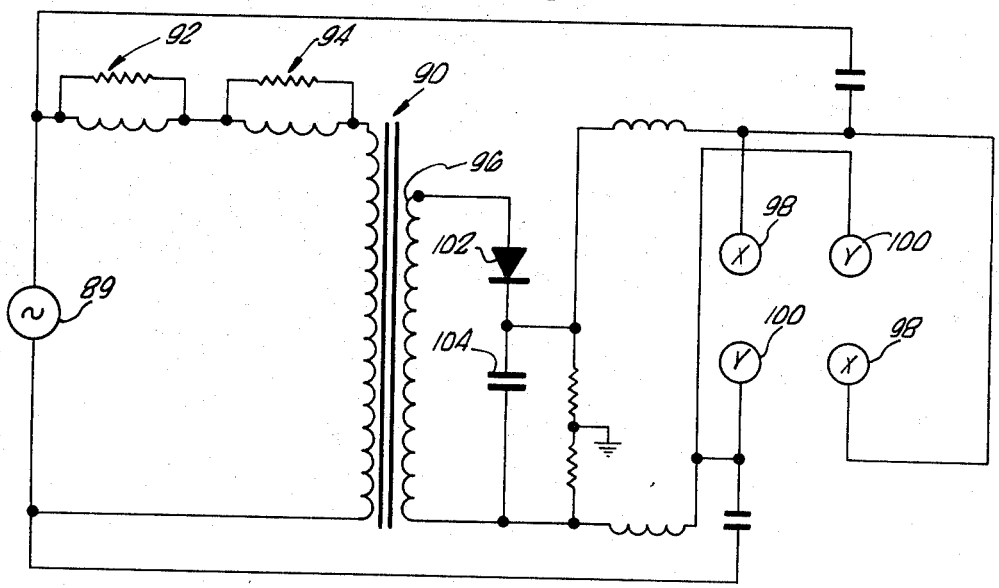

FIG. 6 is a block diagram illustrating an alternate embodiment of the circuit of this invention for providing a variable DC to AC voltage ratio to the rods of the filter, and FIG. 7 is a block diagram illustrating a second alternate embodiment of the circuit of this invention for providing a variable DC to AC voltage ratio to the rods of the filter.

In a typical multipole mass filter, such as that described in U.S. Patent 2,939,952, four elongated continuous electrodes in the form of parallel cylindrical rods are arranged symmetrically about a central axis. The rods are electrically connected in pairs, the opposing rods being connected together. Referring now to FIG. 1, Z denotes the central longitudinal axis of the rods, and one pair of rods 10 and 14 lie with their centers in a Y–Z plane and the other pair of rods 12 and 16 have their centers in an X–Z plane; the three axes (X, Y and Z) being mutually perpendicular according to the convention of a rectangular Cartesian coordinate system. Sources of AC and DC voltages 18, 20 and 22, 24, respectively, are connected to the rods. Ions or charged particles are introduced at one end of the filter and travel generally down the axis of the filter. In traversing the length of the filter, ions of a selected mass-to-charge ratio experience stable trajectories and emerge from the outlet of the filter to reach and charge an ion collector which is connected to a current indicator. Those charged particles having mass-to-charge ratios other than the selected ratio have unstable trajectories and impinge on the field-generating electrodes and thus are neutralized and removed. Charged particle selection, i.e., mass scanning, is controlled by varying the voltage levels on the electrodes or by varying the frequency of the AC voltages.

In the normal quadrupole mass filter the ratio of the DC to AC voltages applied to the rod is maintained constant for all masses. Under such conditions, the resolution of the filter is a constant and the same for all masses. When this is done the peak widths measured in atomic mass units are proportional to the mass being analyzed. Mass spectrum 60 in FIG. 5A is illustrative.

If the resolution is adjusted by manually adjusting the resistance values in the filter power supply to bring the peaks of masses 10 and 11 together at their bases, the same will be true of the peaks at 100 and 110 unless the resistance values are changed to new values. Without such adjustments the peaks between masses 100 and 110 cannot be resolved. However, if the slope of the scan line on a mass filter stability diagram (see FIG. 4) that is, the ratio of the DC to AC potential is made mass dependent, it is possible to have a constant width for peaks of all masses.

The stability diagram of the multipole mass filter is a plot on Cartesian coordinates of two dimensionless parameters, $a$ and $q$, which are proportional to the DC and AC voltages, respectively, which are applied to the rods of the filter. A typical stability diagram is shown in FIG. 4. In this diagram, $q$ is plotted along the abscissa 25 and $a$ along the ordinate 23. The diagram comprises a curve 28 which rises essentially parabolically as $q$ increases to a peak 30 and then diminishes sharply until the $q$ axis 25 is reached. For a more detailed description of the stability diagram of a quadrupole reference should be had to U.S. Patent 2,950,389.

Depending on the resolution desired in a prior art instrument, the ratio of $a$ to $q$ is selected. This selection fixes the ratio of the static and alternating components of the electric field within the filter. Once selected, a scan line such as lines 32, 34 and 36 can be plotted on the stability diagram. The three lines shown on diagram 26 correspond to low, medium and high resolution and to scan lines best suited for analyzing low, medium and high mass ranges, respectively. As indicated above, if the slope of the scan line is made mass dependent, it is possible to have a constant peak width for all masses. Where the mass filter is rearranged to accomplish this result the scan lines of the mass filter can no longer be plotted along lines such as 32, 34 and 36, but rather assume loci such as shown at 29, 31 and 33 in FIG. 4B. The scan lines as shown at 29, 31 and 33 correspond respectively to specific high, medium and low mass values. Whereas previously the scan line was fixed for all masses introduced therein, the instrument is now sensitive to the mass being analyzed and in effect has a plurality of scan lines, a scan line for each mass introduced into the instrument. The curvature of lines 29, 31, and 33 is exaggerated for the purpose of illustrating the difference between these lines and scan lines 32, 34, and 36.

By the proper manipulation and solution of the Mathieu equations it can be theoretically demonstrated that the maximum resolution in a quadrupole mass filter is obtained when the ratio of DC to the peak AC voltage is 0.168. At this value the resolution of the filter is theoretically infinite and no ions can pass through it. In practice this voltage ratio is set at a somewhat lower value depending on the degree of resolution required and the mass range being analyzed.

As just indicated, the resolution obtained in a mass filter is related to the relationship of the DC to the peak value of the AC voltage, $V_{ac}$ with which the apparatus is energized. It has been found that the limiting upper value of $V_{dc}/V_{ac}$ is 0.168. At this point the resolving power of the apparatus approaches a theoretical value of infinity and the transmission of the filter approaches zero. The apex 30 of the stability diagram 26 and the intersection of the $a$ and $q$ axes 23, 25 on the stability diagram define the locus of the scan line 27 corresponding to this theoretical value. For other lower values of the ratio of DC to AC voltages the theoretical resolution for mass values of normal concern ($m \geq 10$) is given by the equation $$\frac{m}{dm} = \frac{V_{ac}}{V_{ac} - \frac{V_{dc}}{0.168}} \quad (1)$$

From the preceding equation it is apparent that the theoretical resolution of the instrument is uniquely determined by the ratio of the DC to the AC voltages applied to the filter rods. When "unit resolution" is to be obtained, $dm$ is equal to 1 and the ratio of the DC to AC voltages is given by the expression $$\frac{V_{dc}}{V_{ac}} = 0.168\left(1 - \frac{1}{m}\right)(\geq 10) \quad (2)$$

Thus, it can be seen that if $m$ becomes infinitely large, the ratio of DC to AC voltage approaches the 0.168 theoretical limit. For lower value masses, for the same condition of unit resolution, it can be seen that the ratio of the two voltages becomes somewhat less than 0.168. This condition is plotted on the diagram of FIG. 3. As shown therein the limiting value, 0.168, of the DC to AC voltage ratio is shown at 38 with the ratio of the DC to AC voltages plotted along the ordinate 40 and mass along abscissa 42. The non-linear variation of the voltage ratio with mass is illustrated by curve 44, a characteristic curve which corresponds to variation in voltage ratio with mass needed to produce uniform peak width in a mass spectrum above a predetermined mass. By providing a control element such as a Zener diode having a breakdown voltage corresponding to $m_0$, the mass value above which it is desired to obtain the resolution control of the present invention, the $V_{dc}/V_{ac}$ characteristic can be caused to begin to change at that point without manually adjusting the power supply resistors, in effect switching the operation of the filter from a scan line, such as 32, as that line is shown in FIG. 4A, to a second scan line corresponding to that portion of the variation of the $V_{dc}$–$V_{ac}$ ratio with mass (see characteristic 44 in FIG. 3) above $m_0$. As shown in the graph of FIG. 3, above $m_0$ the $V_{dc}$–$V_{ac}$ ratio gradually approaches the theoretical limit of 0.168 as mass increases.

The operating point of the control element has an effect on the resolution which is obtained. By choosing a control element such as a Zener diode which has a relatively high breakdown voltage, the voltage ratio remains constant until the Zener conducts, resulting in an instrument with relatively low resolution. Characteristic 43 in FIG. 3 is illustrative. Point $m_0'$ on that characteristic corresponds to the voltage which causes the Zener diode to conduct. A Zener conducting at a lower voltage corresponding to point $m_0$ on characteristic 44 results in a filter with relatively high resolution. As a further refinement several control elements with different operating points can be provided in the power supply circuitry, thereby tailoring the operation of the filter to provide different powers of resolution at various intervals over the mass spectrum to be scanned.

In FIG. 2 is illustrated an electrical schematic diagram showing one way in which control elements such as Zener diodes can be used in the electrical circuitry supplying the existing voltages to the rods of a mass filter such as a quadrupole mass spectrometer to produce a curve similar to curve 44 of FIG. 3. The circuit comprises an adjustable radio frequency generator 46 which is connected by means of a pair of condensers 26 and 28 to two pairs of rods 52 and 54 respectively. The output of generator 46 is also connected to rectifier tubes 48 and 50 to provide rectification of the output from the generator 46 and supply a DC voltage of the proper polarity to the pairs of rods 52 and 54. The remainder of the schematic is essentially that used with conventional mass filters with the exception that two Zener diodes 56 and 58 are provided at the output side of the rectifiers 48 and 50. The threshold voltage of the two Zener diodes is chosen such that they break down and conduct when the output voltage from the generator 46 produces a DC to AC voltage corresponding to, for example, point 47 on curve 44 of FIG. 3.

This is accomplished in the following manner: The symmetrical plus and minus voltage components for the rods are obtained by the passage of current through the matched pair of resistors 60 and 62. The magnitude of this potential is determined by the current through these resistors. This current is made to be non-linearly related to the alternating excitation supplied to the rods by insertion of the Zener diodes across portions of the voltage-dropping resistors. Each pair of Zener diodes will change the slope of the $V_{dc}/V_{ac}$ characteristic at the potential at which it begins to conduct.

Only one pair of Zener diodes has been shown in the schematic diagram of FIG. 2. As indicated above, such a pair is illustrative of a number of pairs (normally each pair has a different voltage breakdown rating) that can be provided across the matched pair of resistors 60 and 62 for obtaining changes in the ratio of the static and alternating field components to produce the resolution desired.

The circuit shown in FIG. 2 is illustrative of a multipole mass filter power supply wherein the AC and DC voltages energizing the rods of the filter are arranged such that the DC is slaved to the AC. In the operation of a conventional mass filter having such a power supply, the magnitude of the AC voltage is increased and the DC voltage follows resulting in a constant ratio of the two voltages. The circuit of a conventional filter is modified and the resolution control of the present invention is obtained by inserting one or more control elements such as Zener diodes to automatically provide a non-linear change in the voltage ratios at predetermined points in the mass scan of the instrument.

Mass analysis and resolution control can be obtained by several other variations in addition to the one illustrated in FIG. 2. Two such embodiments are shown in FIGS. 6 and 7. In FIG. 6 is shown a power supply in which the AC voltage component is slaved to the DC and experiences a corresponding increase or decrease as the DC voltage is increased or decreased. In that circuit a variable DC supply 76 is connected to a linear DC network 78. The positive and negative sides of network 78 are in turn connected to opposite pairs of rods 80 and 82 to supply positive and negative DC potentials to them. The output of the variable DC supply 76 is also connected through a series-parallel resistive network 84 to a DC to AC converter 86. When the voltage across network 84 exceeds a predetermined magnitude, a Zener diode 88 conducts causing an increase in the output from converter 86 resulting in the desired change in slope of the voltage ratio to mass characteristic such as shown in FIG. 3. The output of the converter is connected to the rods 80 and 82 to complete the electrical circuitry of the filter.

Mass scanning in a quadrupole filter is obtained by variation of the magnitude of the voltages applied to the rods or by varying the frequency of the AC excitation applied to the rods. The circuits of FIGS. 2 and 6 illustrate the former approach. The circuit of FIG. 7 shows an embodiment of a circuit to provide the resolution control of this invention using the latter approach. To obtain resolution control, according to the present invention, when mass scan is obtained by frequency variation, a frequency dependent element is inserted in the circuitry between the AC and DC sources. Referring to FIG. 7, a frequency variable AC source 89 is connected to a transformer 90 by means of two parallel R–L circuits 92 and 94. The secondary winding 96 of transformer 90 is connected to opposite pairs of rods 98 and 100 of the filter. A portion of secondary winding 96 is tapped and connected to a diode 102 and capacitor 104 connected in series. The side of capacitor 104 adjacent diode 102 is connected to the first pair of rods 98. The other side of capacitor 104 is connected to the second pair of rods 100. In operation the capacitor 104 is charged to a predetermined potential to provide the DC energization of the rods. As the frequency of source 88 is varied from lower to a higher frequency value, the mass spectrum is scanned from higher to lower masses. This variation in frequency causes R–L networks 92 and 94 to assume a gradually increasing impedance characteristic producing a change in the potential on capacitor 104 and the magnitude of the AC voltage applied to the rods again resulting in the desired non-linear change of the slope of the voltage ratio to mass characteristic. Other circuit variations and circuit elements can, in addition to these just considered, also be employed to obtain the resolution control of the present invention without departing from the scope thereof.

By providing circuits such as those shown in FIGS. 2, 6 and 7, resolution such as that shown in FIG. 5B can be obtained over a wide mass range. In that figure, the signal detected at the collector is plotted along ordinate 64 while mass is plotted along abscissa 66. Peaks 68 and 70 correspond to masses 10 and 11. Peaks 72 and 74 correspond to masses 100 and 110. As can be seen from this figure, the distance between adjacent peaks for masses 10 and 11 is the same as for masses 100 and 101 in the 100 to 110 mass range. Thus, the desired resolution over a wide mass range is obtained.

By choosing $dm$ of the Equation 2 set out above equal to some constant other than 1 and calculating the ratio of the resultant DC–AC voltages, other desired non-linear voltage ratio variations and resolutions can also be obtained without departure from the scope of this invention. The value of $dm$ and hence the resolution of the instrument is dependent upon the circuit parameters of the filter power supply and the mass value corresponding to the point at which the control element operates. Assuming some resolution other than "unit" resolution is desired, the circuit parameters are selected such that $dm$ has a value (e.g. 0.5) which corresponds to the required resolution. In this case the desired voltage ratio relationship is given by $$\frac{V_{dc}}{V_{ao}} = 0.168\left(1 - \frac{0.5}{m}\right) \quad (3)$$

The circuit control elements are then selected to produce a circuit operating according to the relationship of Equation 3. Where the control element is a Zener diode, the breakdown voltage of the Zener is chosen so as to accomplish this result.

What is claimed is:

1. A multipole mass filter comprising:
   a plurality of electrodes spaced symmetrically about a central axis;
   a source of ions to be analyzed located adjacent one end of the electrodes;
   a source of frequency variable AC voltage;
   means for applying the AC voltage to the electrodes to produce an alternating multipole electric field component between the electrodes;
   means for deriving a DC voltage from the AC voltage source;
   means for applying the derived DC voltage to the electrodes to produce a static multipole electric field component between the electrodes;

means for decreasing the frequency of the AC voltage applied to the electrodes;

R–L circuit means connected between the AC source and DC deriving means for causing the ratio of the static field component to the alternating field component to increase as the frequency of the AC voltage applied to the electrodes is decreased by presenting a changing impedance characteristic to the AC source such that unit resolution is obtained for all masses;

collector means located at the end of the rods opposite the ion source; and a housing enclosing the filter.

References Cited

UNITED STATES PATENTS 3,280,325  10/1966  Brunnee et al. _____ 250—41.9

WILLIAM F. LINDQUIST, *Primary Examiner.*